United States Patent
Ulbrich et al.

(10) Patent No.: US 12,114,668 B1
(45) Date of Patent: Oct. 15, 2024

(54) METHOD OF MANUFACTURE AND COMPOSITION OF DOUGH INCLUDING PROTEIN

(71) Applicant: Tyson Foods, Inc., Springdale, AR (US)

(72) Inventors: Carson Joseph Ulbrich, Rogers, AR (US); Sherita Freeman, Prairie Grove, AR (US)

( * ) Notice: Subject to any disclaimer, the term of this patent is extended or adjusted under 35 U.S.C. 154(b) by 322 days.

(21) Appl. No.: 17/177,830

(22) Filed: Feb. 17, 2021

Related U.S. Application Data

(62) Division of application No. 16/284,943, filed on Feb. 25, 2019, now Pat. No. 11,297,843.

(51) Int. Cl.
| | |
|---|---|
| A21D 13/064 | (2017.01) |
| A21C 3/02 | (2006.01) |
| A21C 3/04 | (2006.01) |
| A21C 3/10 | (2006.01) |
| A21D 8/04 | (2006.01) |
| A21D 13/02 | (2006.01) |
| A21D 13/043 | (2017.01) |
| A21D 13/045 | (2017.01) |
| A21D 15/02 | (2006.01) |
| A21D 13/42 | (2017.01) |

(52) U.S. Cl.
CPC .............. *A21D 13/064* (2013.01); *A21C 3/02* (2013.01); *A21C 3/04* (2013.01); *A21C 3/10* (2013.01); *A21D 8/045* (2013.01); *A21D 13/02* (2013.01); *A21D 13/043* (2017.01); *A21D 13/045* (2017.01); *A21D 15/02* (2013.01); *A21D 13/42* (2017.01)

(58) Field of Classification Search
None
See application file for complete search history.

(56) References Cited

U.S. PATENT DOCUMENTS

| | | |
|---|---|---|
| 5,320,859 A | 6/1994 | Namdari |
| 2007/0092619 A1 | 4/2007 | Ning et al. |
| 2017/0027200 A1* | 2/2017 | Avashia ................... A21D 8/02 |
| 2017/0094980 A1 | 4/2017 | Kelly |
| 2018/0042246 A1* | 2/2018 | Buttini ................... A21D 15/00 |
| 2018/0213803 A1 | 8/2018 | Shah et al. |
| 2018/0242596 A1 | 8/2018 | Lych |
| 2019/0045803 A1* | 2/2019 | Richards .................. A23B 4/22 |
| 2019/0297901 A1 | 10/2019 | Patel |

OTHER PUBLICATIONS

U.S. Appl. No. 16/284,943, filed Feb. 25, 2019 entitled "Method and Manufacture and Composition of Dough Including Protein"; Carson Joseph Ulbrich; Sherita Freeman, pp. 1-44.

* cited by examiner

*Primary Examiner* — Lien T Tran
(74) *Attorney, Agent, or Firm* — UB Greensfelder LLP; Mark E. Stallion

(57) ABSTRACT

A method of manufacture and a composition for dough item including a protein source. The technology as disclosed and claimed herein and its various implementations and embodiments are a modified method of manufacture and a composition for a dough item that includes protein. The technology as disclosed and claimed provides a dough based crust or other dough based item that is a protein enriched alternative to conventional breads and crusts and other dough based products. This invention results in a dough that has more protein, more complete protein, and fewer carbohydrates than conventional wheat doughs/breads.

8 Claims, 6 Drawing Sheets

METHOD OF MANUFACTURE AND COMPOSITION OF DOUGH INCLUDING PROTEIN

CROSS REFERENCE

This U.S. Utility Patent Application is a Continuation U.S. Divisional Utility Patent Application claiming priority to and the benefit of U.S. application Ser. No. 16/284,943 filed on Feb. 25, 2019 entitled METHOD AND MANUFACTURE AND COMPOSITION OF DOUGH INCLUDING PROTEIN.

BACKGROUND

FIELD

This technology as disclosed herein relates generally to methods of manufacturing and compositions of dough and, more particularly, to methods of mixing ingredients for dough and composition of ingredients for dough.

In recent years, a trend in food product development has been toward providing products suitable for both quick preparation and convenient consumption Manufacturers of these food items often produce them in shelf ready configurations and are often provided precooked and frozen. Even though many new products meeting these needs have been introduced commercially in recent years, there remains a need for a greater variety of healthful yet convenient products. The ability to commercially produce and sell any specific food product often depends on whether the product can be produced with economies of scale or other efficiencies while still meeting the other criteria of both quick preparation and convenient consumption. Various bakery products have been developed that provide both quick preparation and convenient consumption, including various precooked pizza doughs, bread sticks, flat breads, pitas and tortillas. However, these doughs and breads don't provide much nutritional value and are higher in carbohydrates.

Dough products, generally speaking, can be difficult to manufacture in a large production setting and filled dough products even more so, can present handling and processing challenges that can be difficult to overcome while achieving the flexibility and processing speeds desirable for economical manufacturing. Dough products, whether filled or unfilled, tend to be sticky at some point during their manufacture, which can cause them to be difficult to handle or require equipment cleaning steps once handled. If fillings or toppings are included in a product, the steps of applying or inserting a filling or topping in a way that minimizes waste or mess can present additional challenges. Preparation of leavened dough products may also require the dough to increase in volume upon expansion during a proofing, leavening, or rising step, or when baked. Such expansion will affect oven or proof box space, time, and possibly final packaging size requirements. With these difficulties, little has been produced in the food industry that modifies the basic dough processes in order to improve the nutritional value of the dough item itself. It would be desirable to provide new ways to achieve efficiencies in the manufacture of dough products, including filled dough products, that also improves the nutritional value of the dough product.

Tortillas are manufactured commercially by forming a dough item, flattening the dough to form dough flats, and baking the flats until they leaven and ultimately set. Representative manufacturing processes include pressing, die cutting and hand stretching. The dough typically comprises flour, a leavening system, and water. The leavening system comprises a leavening base and one or more leavening acids. The leavening base and leavening acid(s) react to yield carbon dioxide (neutralization reaction), which, along with any other gases present, leavens the dough. A problem that can arise during manufacture of tortillas is inadequate pliability and strength of the dough. Conventionally, modifying the dough to make it more pliable has weakened the dough. Modifying the dough to strengthen it has made it less pliable. Inadequate pliability and strength negatively impact the handling and processing of the dough as well as the properties of the end product tortilla. Inadequate pliability renders the dough more difficult to handle and process. Inadequate strength reduces the ability of the dough to retain gas during handling and processing. With these difficulties, little has been produced in the food industry that modifies the basic dough processes for tortillas and other like items in order to improve the nutritional value of the dough item itself. It would be desirable to have a dough composition having excellent pliability and strength that also has increased nutritional value. It would be desirable to have a method for manufacturing tortillas wherein the tortillas have excellent physical and product properties and added nutritional items beyond basic dough.

A method of manufacturing and a composition for a dough item is needed for providing for additional nutritional items beyond a basic dough product and that is suitable for both quick preparation and convenient consumption.

SUMMARY

The technology as disclosed herein includes a method of manufacture and composition for a dough item including protein. Dough is a thick, malleable, sometimes elastic, paste made out of any grains, leguminous or chestnut crops. Dough is traditionally manufactured by mixing flour with water and/or other liquid, and sometimes includes yeast and/or other leavening agents as well as other ingredients such as salt, baking powder, various fats, oils and/or flavorings. Prepared shelf-ready dough based products are often partially or fully cooked for both quick preparation and convenient consumption. The technology as disclosed and claimed herein and its various implementations and embodiments are a modified method of manufacture and a composition for a dough item that includes protein. When the term protein is used herein, unless stated otherwise, is primarily referring to a protein source, such as chicken meat being a protein-meaning a source of a protein nutrient. Therefore, when discussing for example, protein being a percentage of the total weight of a composition or mixture, unless indicated otherwise, what is being referred to is the protein source being a percentage of the total weight of a composition or mixture. For example, the chicken meat (protein or protein source) is a percentage of the total weight. Also, when an animal protein source is referred to herein, such as chicken, beef, or mouton, it is primarily the portions of the animal that provide a source of protein.

The dough composition as disclosed and claimed herein can be manufactured using a wheat based flour and/or utilizing other grain based flours such as corn, rice, barley, and/or using other plant based flour and/or cricket flour. For one implementation of the technology other leguminous based flours or chestnut base flours used individually or in combination with any of the other types of flours described herein. For one implementation, a tuber based flour such as potato is also utilized individually or in combination with others such as coconut flour, cauliflower flour and almond flour. One implementation of the method of manufacture and composition for dough as disclosed and claimed herein is utilized for flatbread dough and/or pizza crust dough. However, for one implementation of the technology as disclosed and claimed herein, the technology is adjusted to be used for various flatbreads such as pita, lafa, lavash, bread loaves, biscuits, croissants, matzah, naan, roti, sangak, tortilla and/or yufka. Various other dough products can also be implemented without departing from the scope of the invention. One implementation of the technology is also adjusted for use in pastas, noodles and/or crackers or other snack items. For one implementation of the technology as disclosed and claimed, the protein/protein source utilized is chicken breast meat. Yet other implementations of the technology as disclosed and claimed herein utilize one or more animal based proteins such as pork, beef, turkey, mouton, and/or other animal meat based proteins utilized individually or with other proteins. Again, the component being added to the dough mixture is the protein source, such as a meat item. Yet other implementations of the technology as disclosed and claimed herein utilize plant based proteins, such as soybean, where a plant is the protein source, taken individually or combined with other proteins whether plant based or non-plant bases. Further, modified plant proteins can be utilized such as plant proteins modified with higher concentration of protein or plant proteins modified to resemble the protein of animal meat.

The technology as disclosed and claimed provides a dough based crust or other dough based item that is an alternative to conventional breads and crusts and other dough based products. This invention results in a dough that has more protein, more complete protein, and fewer carbohydrates than conventional wheat doughs/breads. This product turns a traditionally less-healthy food that is higher in carbohydrates into something that is enriched with protein from a protein source. Furthermore, this dough is a better alternative for people with health issues that are exacerbated by carbohydrates and dough based items, or those who are health conscious but like to indulge occasionally. This invention incorporates animal protein (for one implementation-chicken) into a traditional dough item. This creates a more protein nutrient rich bread/crust without sacrificing the bread/crust texture and flavor that consumers know and expect.

The raw chicken dough or other doughs enriched by a protein source as described herein, handle similarly to normal doughs. Therefore, it can potentially be made into several different bread forms such as pizza crusts, bread sticks, flat breads, pitas, tortillas, etc. The final product gives operators a lower carbohydrate item to add to their menu at their establishment without requiring additional equipment in the kitchen. Furthermore, consumers will feel better about eating dough based food items and serving these dough based items since the items are more protein enriched than regular wheat crust and having lower carbohydrates.

One method of manufacture includes a step of processing chicken breast meat and the natural proportion of chicken skin by finely grounding the meat protein at an approximately (3/32 inch) grinding size. For one implementation of the technology, the protein source is size reduced to less than approximately ½ inch. The size reduction can vary among sizes less than ½ inch depending on the application. The method of manufacture, for one implementation, also includes a step of adding a marinade to the lean breast meat inside of a dough mixer, and it is mixed until the solution is absorbed. For one implementation fat is added to the ground and marinated breast meat. Together, the meat and marinade mixture is mixed until all the ingredients are evenly distributed. For one implementation the skin from the meat source is added to the mixture, such as chicken skin. The appropriate amount of flour is mixed with leavening ingredients baking powder and other ingredients for taste. The flour/leavening/seasoning mix is added to the marinated meat mixture. These ingredients are allowed a few minutes to mix together and for one implementation shortening is added or other comparable plant based or animal based oils. The mixture is mixed until it is evenly incorporated into the dough and the dough looks "developed" and ready to form. Various size reduction methods can be used in order to size reduce the protein source, including a bowl chopper and an emulsion mill.

The dough is removed from the mixer and is portioned into dough balls using a divider rounder. The portioned dough balls are pressed into shape using a heated dough press. The formed dough is fully cooked in an oven to an internal temperature that is sufficient to fully cook the dough and the type of protein. Various animal proteins may require being cooked to an internal temperature as guided by USDA standards. For one implementation, the dough is fully cooked to an internal temperature of at least 165 F. The fully cooked bread is IQF frozen, and packaged. For one implementation of the dough technology, the dough is only partially cooked or is raw. The partially cooked or raw dough is refrigerated or frozen. For one implementation of the frozen fully cooked, partially cooked or raw dough, the product is made so that it can be topped with sauce, cheese, icing, sweet glaze and other toppings then heated and served. For one implementation the composition of the dough comprises about approximately 35% to 70% protein by weight of total mixture, about approximately 30% to 50% flour by weight of total mixture, about approximately 4% to 6% leavening ingredient; about approximately up to 10% water by weight of total mixture, and about approximately up to 1% Salt by weight of total mixture.

For one implementation of the method of manufacture, the process includes starting with a cold substrate, meat, whereas traditionally dough ingredients do not require refrigeration on the front end. This process utilizes a grinder or other size reduction device, or the meat must be ground/size-reduced prior to arriving at the dough manufacturing station. A dough mixer uses the correct mixing action to develop the dough and allow it to be removed without it sticking. For one implementation, the dough composition includes 30-50 percent chicken. One implementation of portioning the dough includes one or more traditional dough portioning methods (Divider Rounder or Dough Sheeter; traditional meat portioning methods (such as a Reiser™ Meatball Extruder); and/or other portioning equipment that is found in typical bakery and meat facilities. For one implementation, depending on the type of dough press, a heated dough press might need to be set lower than traditional settings for conventional dough products. If sheeted or pressed flat, for one implementation, the dough is docked using a docker. The dough is partially or fully cooked utilizing a linear oven or other cooking means.

One implementation of the method of manufacture of a dough based item includes chilling a protein and size reducing the protein, as needed, sufficiently for mixing, and mixing a marinade including water, phosphate and salt, and adding said marinate to the chilled and size reduced protein, and mixing flour and leavening with the chilled marinated size reduced protein to form a dough. The method of manufacture further includes portioning the dough into a dough portion for further processing. One implementation of the method of manufacture includes mixing flavor particulates with chilled marinated size reduced protein. For one implementation, the method of manufacture further includes mixing chicken skin with marinated sized reduced protein, where the protein is chicken meat.

The method of manufacture for one implementation is where the flour is one or more of a corn masa flour, a wheat flour, a cauliflower powder flour; a bean based powder flour; and a tuber based flour, and/or the protein is one or more of ground chicken meat protein, ground turkey meat protein, ground pork protein, ground beef protein and ground mutton protein. For other implementations, other size-reduction methods are utilized to size-reduce the protein source. The method of manufacture for yet another implementation includes heat pressing the dough portion into a flattened dough portion, docking the flattened dough portion, and cooking the flattened dough portion, whereby the portioning is performed with a divider rounder. The method of manufacture for yet another implementation includes docking a dough sheet, die cutting the docked dough sheet, and cooking the docked dough sheet, where portioning is with a dough sheeter portioning into a dough sheet. For another implementation portioning is performed with an extruder and an extrusion cutter.

One implementation of the technology as disclosed and claimed herein is a composition for a dough based item, which includes a dough mixture including about approximately 35% to 60% protein by weight of total mixture, about approximately 35% to 55% flour by weight of total mixture, about approximately 1% to 6% leavening ingredient, about approximately less than 5% water by weight of total mixture and about approximately up to 2% Salt by weight of total mixture. For another implementation the composition for a dough based item includes about approximately 10% to 20% Skin by weight of total mixture, and for one implementation, where the protein is about approximately 60% to 80% chicken by weight of total mixture and/or the skin is chicken skin. One implementation of the composition for a dough based item includes, dry ingredients added for one or more of flavor and increased shelf life.

The composition for a dough based item for yet another implementation is where chicken protein is about approximately 20% to 50% by weight of the total mixture, flour is about approximately 50% to 70% by weight of the total mixture, leavening ingredient is about approximately 1% to 6% by weight of the total mixture, the skin is about approximately 2% to 10% by weight of the total mixture, the water is about approximately 2% to 6% by weight of the total mixture and the salt is about approximately up to 2% by weight of the total mixture. For one implementation the composition for a dough based item, the flour is one or more of a corn masa flour, a wheat flour, a cauliflower powder flour; a bean based powder flour; and a tuber based flour, and where the protein is one or more of ground chicken meat protein, ground turkey meat protein, ground pork protein, ground beef protein and ground mutton protein. For various implementations, the protein source by weight of total mixture can range from about approximately 5% to about approximately 80%. For one implementation the composition for a dough based item includes a dough mixture including approximately 20% to 80% protein source by weight of total mixture; and approximately 15% to 55% flour by weight of total mixture.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

Figure 1:
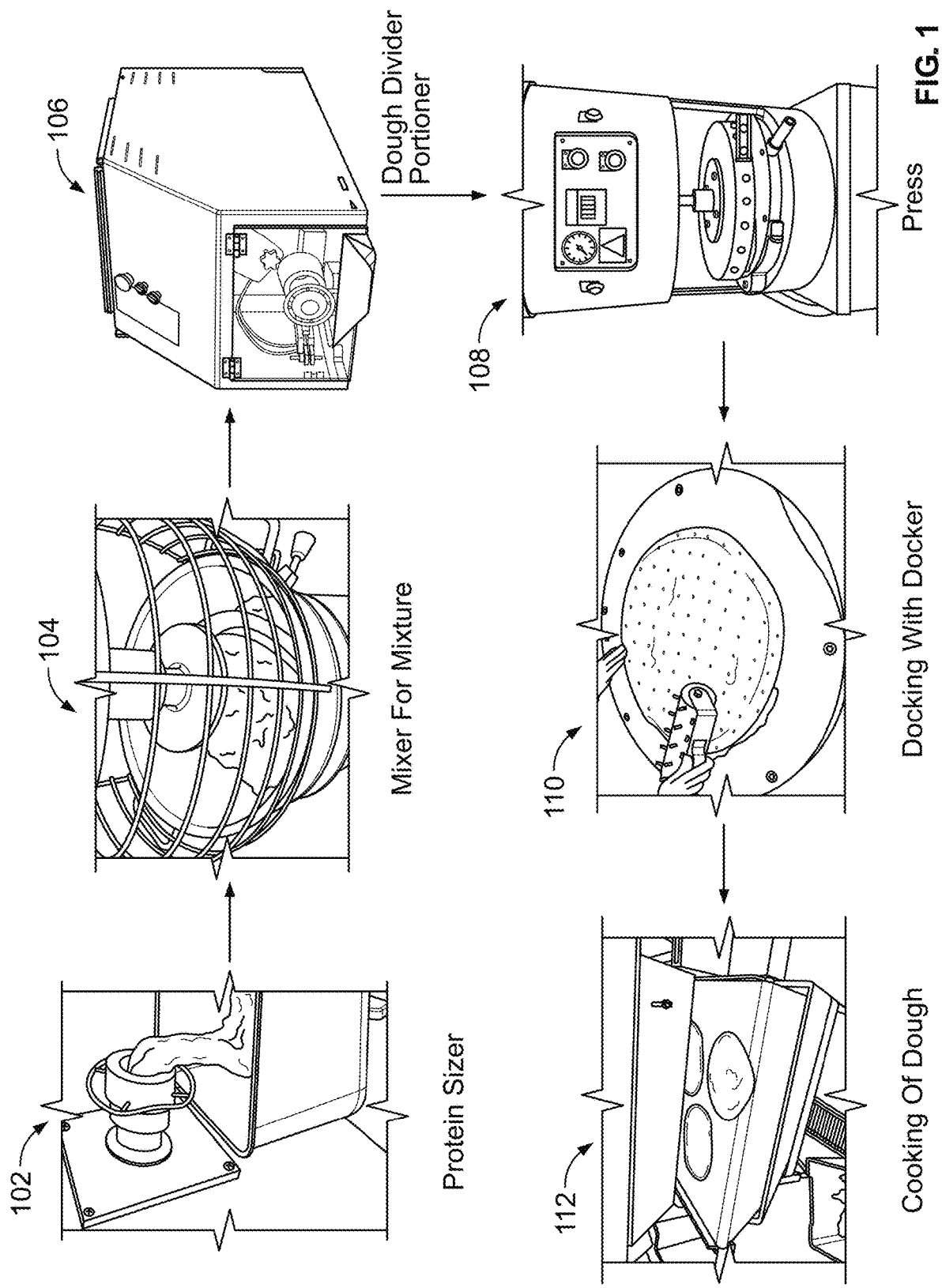
FIG. 1 is an illustration of the manufacturing stations and flow.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-2 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising a method of manufacturing and a composition for a dough including protein, which teaches a novel method of manufacture and composition for a dough based item having increased nutritional value as compared to traditional dough items.

The details of the technology as disclosed and various implementations can be better understood by referring to the figures of the drawing. Referring to FIG. 1, an illustration of the various stations in the process is provided. For one implementation of the method of manufacture, the process includes providing a protein such as meat, and grinding the meat at a grinding station 102. A mixer station 104 is used to mix the ground meat and flour and other ingredients, if any, with the correct mixing action to develop the dough and allow it to be removed without it sticking. The mixed dough is extruded to a dough portioner/dough divider station 106 where the dough is portioned. One implementation of portioning the dough includes one or more traditional dough portioning methods (Divider Rounder or Dough Sheeter; traditional meat portioning methods (such as a Reiser™ Meatball Extruder); and/or other portioning equipment that is found in typical bakery and meat facilities. For one implementation, depending on the type of dough press, a heated dough press 108 is utilize and might need to be set lower than traditional settings for conventional dough products. If sheeted or pressed flat, the dough will need to be docked using a docker 110. The dough is partially or fully cooked utilizing a linear oven 112.

Figure 2A:
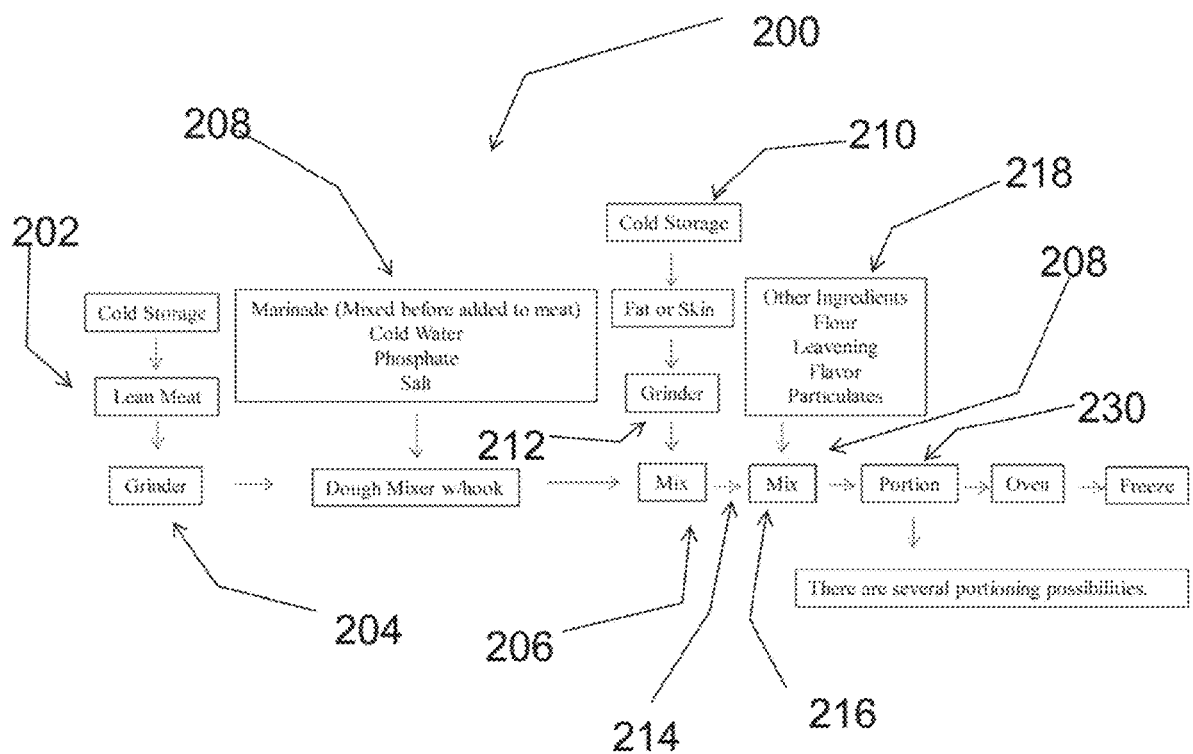
FIG. 2A-2E is a process flow of the manufacturing method.
Figure 2B:
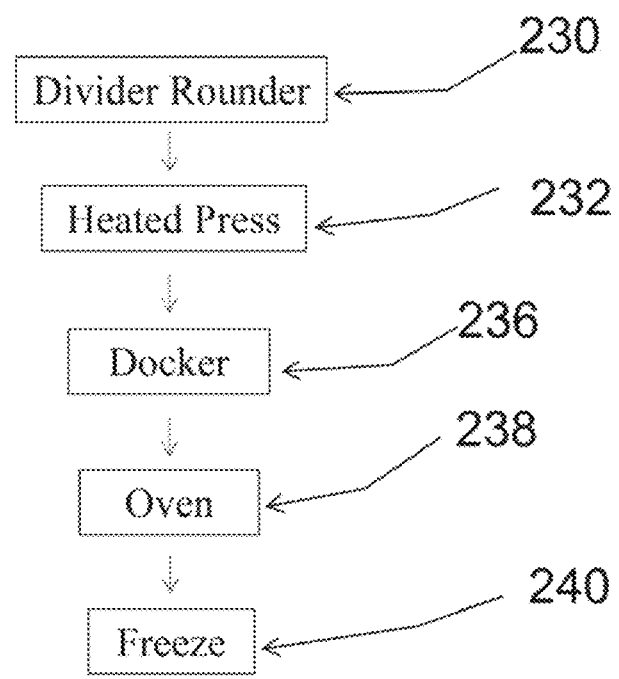

Referring to FIG. 2A, a process flow 200 of the manufacturing method is provided. A lean meat product is chilled 202 in a cold storage area for a time until the lean product (protein source) is brought to a core temperature of specified degrees Fahrenheit, which may vary based on the type of protein. For one implementation of the method of manufacture, the lean product (protein source) is chicken breast meat. For other implementations one or more of the following animal proteins can be utilized including animal based proteins such as pork, beef, turkey, mouton, and/or other animal meat based proteins utilized individually or with other proteins. Yet other implementation of the technology as disclosed and claimed herein utilizes plant based proteins, such as soybean, taken individually or combined with other proteins. The chilled chicken breast meat is finely ground 204 at ³⁄₃₂ inch(es), plus or minus ⅛ inch(es), using a meat grinder. For one implementation, the method of manufacture includes a step of adding a marinade 208 to the lean breast meat inside of a dough mixer, and it is mixed until the solution is absorbed. For an implementation where marinade is used, for one implementation the marinate includes cold water at a temperature of about approximately 36 degrees Fahrenheit, plus or minus about 4 degrees Fahrenheit and at an amount of 10 percent, plus or minus 5 percent of the total weight of the ground meat and marinade, phosphates at about 0.3 percent, plus or minus 0.2 percent of the total weight of the ground meat and marinade, and salt at about 0.5 percent, plus or minus 0.2 percent of the total weight of the ground meat and marinate. The marinate is mixed 206 and it is added 208 to the meat. For one implementation of the method, fat and a natural proportion of associated chicken skin with respect to the chicken breast is chilled in cold storage 210 for a time appropriate for the protein. However, for one implementation, the protein, fat and/or skin need not be chilled. The chilled fat and or chicken skin (or un-chilled) is finely ground 212 at ³⁄₃₂" using a meat grinder. The finely ground fat and/or skin is added 214 to the ground and marinated breast meat. The fat and/or skin is added at an amount of 15 percent, plus or minus 5 percent of the total combined weight of the ground meat, marinade and fat/skin. Together, the meat, fat/skin, and marinade mixture is mixed 216 for about approximately 5 minutes and/or until all the ingredients are evenly distributed.

The appropriate amount of flour is mixed 218 with leavening ingredients and other ingredients for taste. The flour/leavening/seasoning mix is added to the marinated meat and skin. The flour is added at an amount of 50 percent, plus or minus 20 percent of the total weight of the dough. The leavening ingredients are added at an amount of 7 percent, plus or minus 5 percent of the total weight of the dough. For yet another implementation flavor ingredients are added at an amount of 3 percent, plus or minus 2.5 percent of the total weight of the dough. These ingredients are allowed a few minutes, such as 3 minutes, plus or minus 1 minute, to mix together and shortening is added.

Figure 2C:
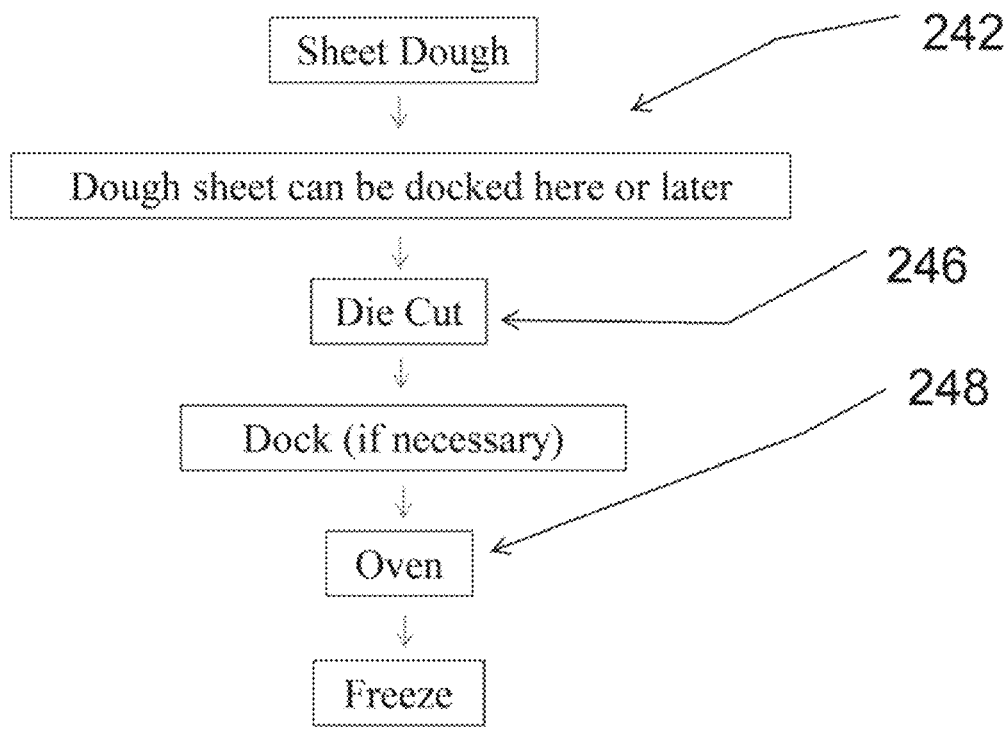
Figure 2D:
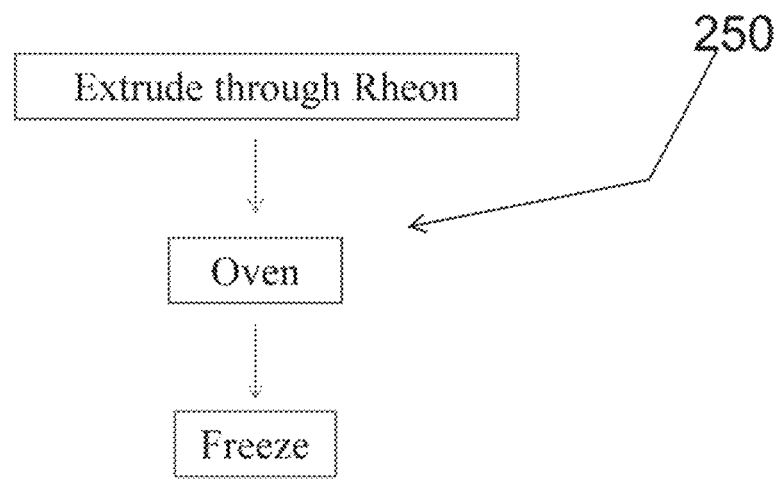
Figure 2E:
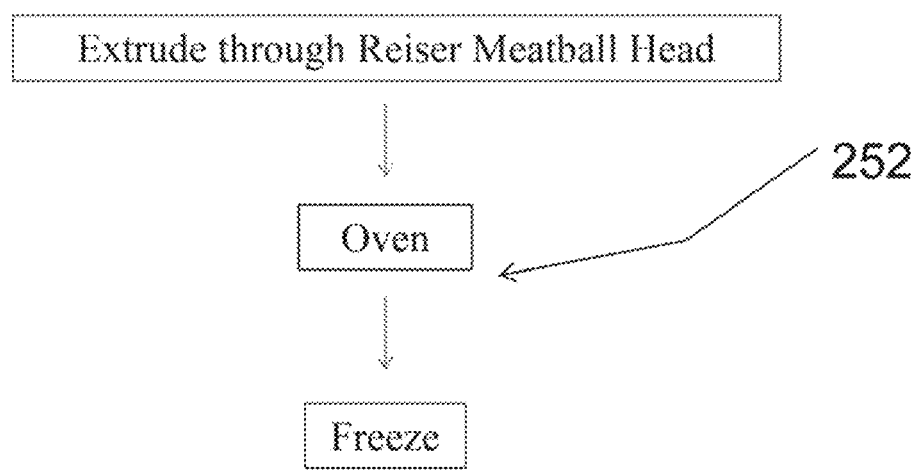

For one implementation shortening is added at an amount of 5 percent, plus or minus 5 percent of the total weight of the dough. The mixture is mixed until it is evenly incorporated into the dough and the dough looks "developed" and ready to form. The dough is removed from the mixer is portioned 230 into dough balls using a divider rounder, See FIG. 2B, or is portioned using other portioning methods as seen in FIGS. 2C-2E. The portioned dough balls, having a weight of about approximately 130 g, plus or minus 10 g, are pressed 232 into shape using a heated dough press where the heated dough press is at a temperature of 200 degrees Fahrenheit, plus or minus 25 degrees Fahrenheit. For one implementation the press temperature is colder to minimize shriveling of the product. The pressed dough is processed through a docker 236, which is essentially a spiky rolling pin that punctures small vent holes in the dough to prevent the dough from blistering and from rising in large uneven pocket areas during the baking/cooking process. The formed dough is fully cooked 238 in an oven for 3 minutes, plus or minus 2 minutes, and/or to an internal temperature of at least 165 degrees Fahrenheit. The fully cooked bread is IQF (individual quick freeze) frozen 240, and packaged. For one implementation, the frozen chicken dough product is made so that they can be topped with sauce, cheese, icing, sweet glaze and other toppings then heated and served.

For one implementation a dough sheet is processed through a docker, which is essentially a spiky rolling pin that punctures small vent holes in the dough to prevent the dough from blistering and from rising in large uneven pocket areas during the baking/cooking process. The spike density/pattern of the docker can be at least one spike per square inch.

For one implementation, the dough portioning is performed with a dough sheeter 344 FIG. 2C. The dough sheet 242 is die cut 246. The portion dough is cooked in the linear oven 248 and then frozen. Two extrusion 250 and 252 methods are also illustrated in FIGS. 2D and 2E.

For one implementation, the oven is preheated to a temperature of about 400 degrees Fahrenheit, plus or minus 100 degrees Fahrenheit.

The various implementations and examples shown above illustrate a method and system for a method of manufacture and a composition for dough item including protein. A user of the present method and system may choose any of the above implementations, or an equivalent thereof, depending upon the desired application. In this regard, it is recognized that various forms of the subject dough method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the intent and scope of the present implementation(s). Accordingly, the specification and drawings are to be regarded in an illustrative rather than a restrictive sense.

The various manufacturing methods and composition examples shown above illustrate a method of manufacture and a composition for dough item including protein that has a higher nutritional value than traditional dough items. A user of the present technology as disclosed may choose any of the above implementations and embodiments, or an equivalent thereof, depending upon the desired application. In this regard, it is recognized that various forms of the subject method of manufacture and a composition for dough item including protein could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A method of manufacture of a dough based item comprising:
    size reducing a meat protein source sufficiently for mixing;
    mixing flour with the size reduced meat protein source to form a dough, where the dough mixture comprises, an approximately 20% to 80% meat protein source by weight of total mixture, and an approximately 15% to 55% flour by weight of total mixture, and an approximately up to 5% water by weight of total mixture;
    heat pressing the dough portion into a flattened dough portion;
    cooking the flattened dough portion;
    docking the flattened dough portion; and
    portioning the dough into a dough portion, where said portioning is with a divider rounder.

2. The method of manufacture as recited in claim 1, comprising:
    mixing a leavening with the flour and the size reduced meat protein source.

3. The method of manufacture as recited in claim 2, Comprising:
    mixing a marinate including one or more of water, phosphate and salt, and adding said marinate to the size reduced meat protein source and mixing.

4. The method of manufacture as recited in claim 3, comprising:
    mixing flavor particulates with the marinated size reduced meat protein source.

5. The method of manufacture as recited in claim 3, comprising:
    mixing chicken skin with the marinated sized reduced meat protein source; and
    where the meat protein source is chicken meat.

6. The method of manufacture as recited in claim 1, where the flour is one or more of a corn masa flour, a wheat flour, a cauliflower powder flour, a bean based powder flour, coconut based flour, a rice based flour, an almond based flour, a tuber based flour, other plant based flour, and cricket flour.

7. The method of manufacture as recited in claim 3, where the meat protein source is one or more of a ground chicken meat protein source, a ground turkey meat protein source, a ground pork protein source, a ground beef protein source, a ground ovine protein source, a ground goat protein source and a ground mutton protein source.

8. The method of manufacture as recited in claim 7, where the flattened dough portion is a dough sheet portion, the method further comprising:
    die cutting the dough sheet portion;
    cooking the die cut dough sheet portion; and
    where portioning is with a dough sheeter portioning into the dough sheet portion.

* * * * *